United States Patent [19]
Coura et al.

[11] Patent Number: 6,029,302
[45] Date of Patent: Feb. 29, 2000

[54] CLEANABLE SCRAPER STATION

[75] Inventors: Herbert Robert Coura, Büchen; Gundar Helge Scholz, Reinbek, both of Germany

[73] Assignee: Tuchenhagen GmbH, Büchen, Germany

[21] Appl. No.: 08/737,630

[22] PCT Filed: May 12, 1995

[86] PCT No.: PCT/EP95/01812

§ 371 Date: Nov. 18, 1996

§ 102(e) Date: Nov. 18, 1996

[87] PCT Pub. No.: WO95/33952

PCT Pub. Date: Dec. 14, 1995

[51] Int. Cl.[7] .................................................. B08B 9/06
[52] U.S. Cl. ............................... 15/3.5; 15/104.062
[58] Field of Search ................... 15/3.5, 3.51, 104.062; 137/15

[56] References Cited

U.S. PATENT DOCUMENTS

| | | | |
|---|---|---|---|
| 2,172,636 | 9/1939 | Coberly | 15/3.51 |
| 2,948,143 | 8/1960 | Pruitt | 15/104.062 |
| 4,185,809 | 1/1980 | Jonnes . | |

FOREIGN PATENT DOCUMENTS

| | | | |
|---|---|---|---|
| 375532 | 6/1990 | European Pat. Off. . | |
| 1775303 | 6/1970 | Germany | 15/104.062 |
| 91173861 | 11/1991 | WIPO . | |

*Primary Examiner*—Randall E. Chin
*Attorney, Agent, or Firm*—Lane, Aitken & McCann

[57] ABSTRACT

The invention concerns a cleanable scraper station which is designed as a dispatch/receive station (1;1\*) and through which the product or cleaning agent flows. The aim of the invention is to improve the cleanability of the scraper station compared with prior art devices, as measured by increased throughput, and in particular to ensure through cleaning of the entire scraper surface. This is achieved by virtue of the fact that the scraper (9) is positioned with play in all directions when in the through-flow position (II,II\*) by means of a controllable second stop (6a;6a\*) acting in conjunction with a displaceable first stop (5a,5a\*) or by means of the controllable second stop (6a;6a\*) acting in conjunction with a coupling cage (50;50\*) connected to the displaceable first stop (5a;5a\*) and in which the scraper (9) is positively locked, or only by means of the coupling cage (50;50\*) connected to the displaceable first stop (5a;5\*) and in which the scraper (9) is positively locked.

25 Claims, 6 Drawing Sheets

CLEANABLE SCRAPER STATION

BACKGROUND OF THE INVENTION

The invention relates to a cleanable scraper station.

A cleanable scraper station of the type indicated is known from the marketing and shop drawings of a manufacturer and supplier of cleanable pipeline systems; these printed publications have been made available only to a limited number of users but not to the public at large.

Both product and, in the case of flush cleaning, a cleaning means flows through the state-of-the-art scraper station; as a result of the prescribed immobilization of the scraper in the scraper station, contact surfaces are formed between scraper and scraper housing which are not accessible for adequate cleaning during flushing.

To this extent it exhibits the cleaning process disadvantages of another state-of-art cleanable scraper station (WO-A-91/17386); product does not flow around the latter during its travel, in contrast to the former, so that, especially in the processing of high-quality or hygienically especially sensitive products, the passage section of a T-branch facing the scraper station is not scrapeable for the purpose of recovering the product which has accumulated there. Although the reference does contain a statement to the effect that the dispatching or receiving station is connected directly to the product flow section by way of the transitional element of the T-branch, in each instance there nevertheless remains an area in which product losses occur and, on the other hand, in which the product stagnates during product flow, since this area cannot be sensed by the product flow as dead space.

Hence the invention is based on the problem of developing a generic scraper station so that its cleaning capacity during flushing is improved, uninterrupted cleaning of the entire surface of the scraper in particular being ensured.

The decisive difference between the scraper station claimed for the invention and that of the state of the art is that in a first embodiment the scraper is placed in its flow-around position by means of a controllable second stop in conjunction with the movable first stop. The positioning is designed so that the scraper is separated by adequate clearance from the components bounding it on all sides, that is, so that the scraper possesses limited mobility on all sides. In an alternative second embodiment the scraper is additionally positively locked in a screen cage guard which is connected to the movable first stop. An alternative third embodiment provides that the scraper be placed in its flow-around position exclusively by means of a screen cage guard connected to the movable first stop in its flow-around position.

The screen cage guard mounted on the movable first stop, which guard consists in one preferred embodiment claimed for the invention of at least two U-shaped elements which, as viewed axially outward, form an insertion opening, an opening narrowed relative to the latter, and a radially widening grip opening, imparts additional advantages to the cleanable scraper station. Firstly, the scraper can be gripped securely, even in the vertical inlet direction of movement against the force of gravity in the enlarged cross-section, and moved from its closed position to its flow-around position in the enlarged cross-section. This is ensured by positive-locking retention of the scraper between at least three U-shaped elements. In addition, the positive locking retention of the scraper may be designed so that the scraper cannot free itself from its positive locking retention. In this case the controllable second stop may be dispensed with. The positive-locking retention of the scraper is overcome only if the scraper is transferred by the screen cage guard to its locked position and then forced from the guard by the product impinging on it and into the cleanable pipeline section adjoining it. Another advantage of the positive locking retention of the scraper in the screen cage guard is that the scraper can easily be removed from the opened scraper station by means of this positive locking.

In order to be able to clean the scraper on all sides by flushing, an especially advantageous development of the scraper station claimed for the invention provides a stationary stop that delimits the location of the scraper in its flow-around position in the enlarged cross-section if, after movement of the movable first stop by a partial travel distance length T1 from the end position of the movable first stop or of the screen cage guard determining immobilization of the scraper in its flow-around position in the enlarged cross-section, a controllable second stop makes movement of the scraper away from its location possible. As a result of this measure, the contact surface between the scraper and the movable first stop may be freed so that cleaning means may be applied to this surface of the scraper otherwise covered by the stop (this is the frontal surface in the exemplary embodiment).

Optimum cleaning conditions for the scraper are created if, as is provided by another design of the scraper station claimed for the invention, the scraper comes to rest outside its contact area with the movable first stop or with the screen cage guard. It has been found to be advantageous for the stationary stop to be annular in form and to have a central passage, so that cleaning means, and if desired, product as well, can flow through the scraper station on the way through this central passage. For one thing, this flow control ensures efficient and symmetrical flow around the scraper, and for another flow losses due to the stationary stop are reduced to a tolerable level.

In a second embodiment particular advantages are presented by design of the stationary stop in the form of two U-shaped elements which are mounted in reciprocal diametrical and radial symmetry and are convex in shape in the area of their contact surface with the scraper. This design reduces the contact surface with the scraper to the absolutely necessary minimum.

In the case of high-quality or hygienically sensitive products, another advantageous embodiment of the scraper station claimed for the invention provides that the quantity of product in the scraper station not involved in the scraping process be reduced by mounting the connection for the pipeline section directly on the duct of the movable first stop. It is also advantageous for the interior of the scraper station in the area of the connection in question to be designed so as to be free of dead space, by having an interior profile conforming to the flow, that is, one which conforms to the streamline pattern during free flow through the scraper station. These interior adaptations also make certain that no amounts of product will stagnate in the area of the duct as the product travels through the passage in the movable first stop.

Flow around the scraper in the enlarged section is in another embodiment of the scraper station claimed for the invention ensured by providing at least three spacers which keep the scraper a certain distance from a housing of the scraper station circumferentially in the area of the enlarged cross-section. It has been found expedient to design the spacers in the form of cylindrical rods which enclose the scraper on all sides as a cage, with clearance, and which are especially easy to clean during flushing.

In order to move the scraper from its flow-around position to its locked position, another embodiment of the scraper station claimed for the invention provides a movable first stop which it is expedient to design as an adjusting rod, which engages the scraper station on the fly in the direction of movement by means of a first drive. The frontal surface of the adjusting rod becomes a stopper for the scraper when the scraper station operates as a receiving station.

In order to ensure the movements of the movable first stop required for optimum control of cleaning means in the scraper station, another advantageous embodiment of the scraper station claimed for the invention provides that the first drive alternatively be activated by pressure means; as a result, firstly, the movable first stop can be transferred in one direction by a primary movement to an end position, one in which the scraper is situated in its flow-around position in the enlarged cross-section and as a result, secondly, partial movement T1 may be executed against a spring in the first drive. While the movable first stop is moved to its initial position by the return spring after the partial movement T1 of the stop, return movement takes place following the primary movement as a result of application of pressure means to the piston in the opposite direction. Achievement of the pertinent end position before and after the primary movement is sensed by revertive communications devices which sense and report the pertinent position of the movable first stop.

The scraper is advantageously placed in its flow-around position in the enlarged cross-section in accordance with the alternative first embodiment by designing the controllable second stop as a retaining rod which is caused by a second drive to engage the scraper station transversely to the direction of movement of the scraper and the end of which facing away from the drive is seated in a thrust bearing in the housing of the scraper station. The twofold seating of the retaining rod makes certain that the scraper will not be bent or tilted by pressure forces acting on the scraper, ones which may press against the retaining rod.

A design which is better from the viewpoint of cleaning procedure is ensured by the alternative second embodiment in that the controllable second stop is made up of two lugs which are positioned in reciprocal diametrical and radial symmetry and each of which is introduced into its engaged position by a second drive at an angle smaller than 90 degrees, as measured relative to the direction of departure of the scraper from the scraper station, in the enlarged cross-section of the latter. This arrangement eliminates the thrust bearing of the retaining rod, which creates problems from the viewpoint of cleaning procedure, in that a special procedure must be followed in cleaning this bearing. Choice of a suitable angle at which the lugs engage the enlarged cross-section ensures that the pertinent retaining force applied to the rod will be no greater than that in the case of purely axial support.

Another expedient embodiment of the scraper station claimed for the invention provides in this connection that the second drive, when in the nonactivated state (at rest), will transfer the controllable second stop to the engaged position referred to above. When in the nonactivated position the scraper is accordingly positioned between the adjusting rod and the second stop (retaining rod or lugs). The scraper may be moved to its locked position only when the two drives are linked by control engineering means; in another expedient embodiment of the proposed scraper station, both the engaged position of the controllable second stop and its second end position, a released position, are sensed by a revertive communications device.

In order to be able to clean the controllable second stop in the area of its engagement in the thrust bearing in the housing as well, another embodiment of the scraper station claimed for the invention provides that this stop may be returned by means of its drive in the direction of the released position by a partial travel distance T2 from its engaged position in the thrust bearing in the housing in the direction of the released position.

In fully automatic systems in which the cleanable scraper station claimed for the invention is used, it is advantageous or often even absolutely necessary (see above discussion of the first drive) to provide revertive communication devices for sensing the position of the scraper in the scraper station. Revertive communication devices are provided in another advantageous embodiment of the proposed scraper station which sense at least the dispatch position or locked position and the flow-around position of the scraper.

In order to prevent undesirable pressure losses during flow through the scraper station, and especially during flow of product, provision is made such that both the second connection and the passage cross-section in the enlarged cross-section are provided with a cross-section which corresponds more or less to the passage cross-section of the scrapeable pipeline section.

In order to ensure danger-free disassembly of the cleanable scraper station, provision is made in another embodiment claimed for the invention such that the scraper station is provided, on a rod passage designed as a cover element with a safety lock operating essentially as a bayonet lock, this safety lock allowing opening of the scraper station only after the pressure in the latter has been reduced.

BRIEF DESCRIPTION OF THE DRAWINGS

Exemplary embodiments of the cleanable scraper station claimed for the invention are illustrated in the drawing and discussed with reference to it. In the drawing

DETAILED DESCRIPTION OF THE PREFERRED EMBODIMENTS

A cleanable scraper station (FIG. 1), which may be used both as a dispatching 1 and as a receiving station 1*, consists of a preferably cylindrical housing 1a to which a scrapeable pipeline section is connected on one side by way of a first connection 1b. Opposite the connection 1b the housing 1a has a first housing flange 1d on which a first rod passage 1g is mounted which closes off the scraper station 1, 1* from the surroundings on this side and in which a movable first stop 5a in the form of an adjusting rod is sealed. A first rod seal is provided for the purpose of sealing. The adjusting rod 5a is connected to a first drive (not shown) which transfers the adjusting rod 5a to the end position shown.

Figure 1:
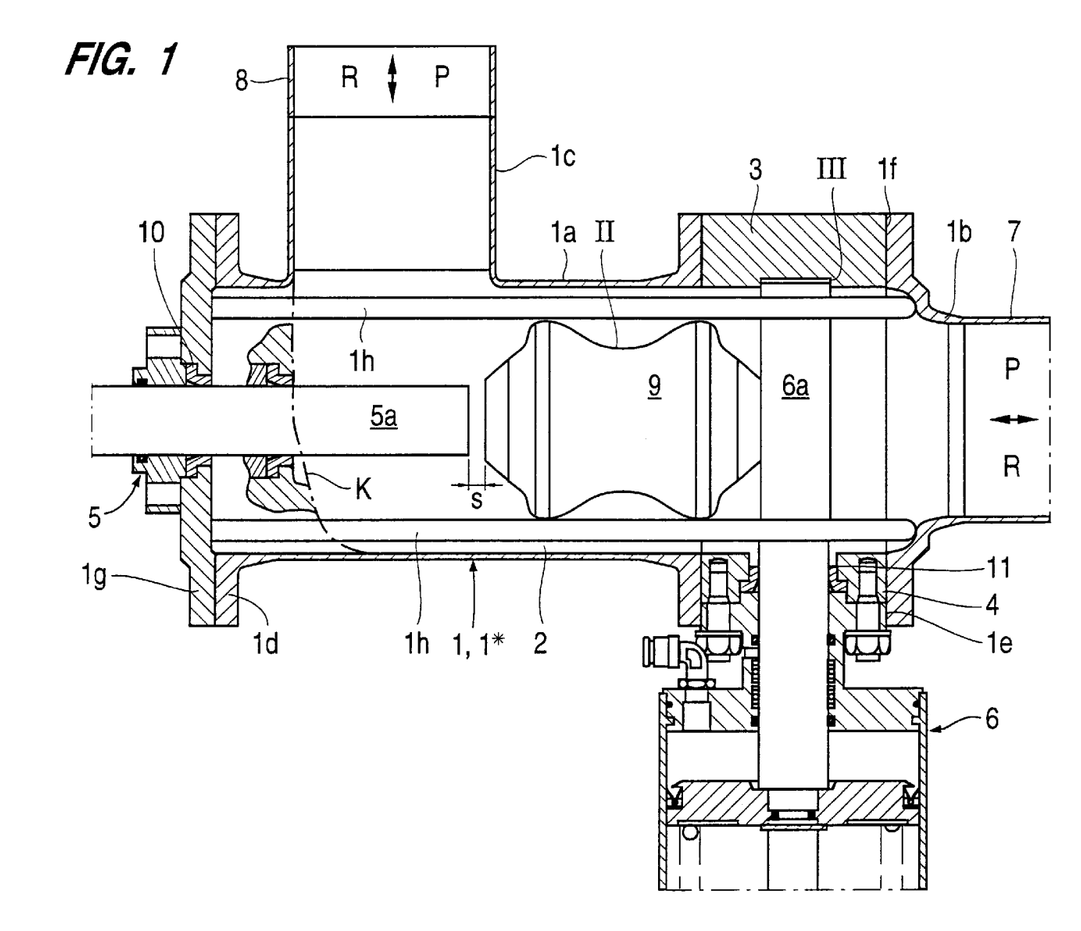
FIG. 1 shows a cross-section through a first exemplary embodiment of the alternative first design of the cleanable scraper station claimed for the invention, one in which the scraper is in the flow-around position when in the enlarged cross-section.

On the first rod passage there are provided at least three spacers 1h which in the area of an enlarged cross-section 2 retain a scraper 9 circumferentially with clearance away from the housing 1a of the scraper station 1, 1*. The scraper 9 is delimited on its side facing away from the adjusting rod 5a by a controllable second stop 6a, which preferably is in the form of a retaining rod, the latter engaging the scraper station 1, 1* transversely to the direction of movement of the scraper 9 by means of drive 6. For this purpose the housing 1a of the scraper station 1, 1* has on its circumference two opposite necked areas which form on the side of the second drive 6 a first opening in the housing 1e and on the other side a second opening in the housing. The retaining rod 6a is sealed in the first opening in the housing 1e by way of a second rod seal 11 inside a second road passage 4, while a thrust bearing 3 holding the end of the retaining rod 6a is provided in the second opening in the housing.

There is provided in the area of the enlarged cross-section 2 a second connection 1c to the scraper station 1, 1* for a pipeline section 8 over which both product P and cleaning means R may be supplied or removed. The scraper 9 assumes its flow-around position II between the adjusting rod 5a and the retaining rod 6a, flow around it in both directions in the enlarged cross-section 2 being possible. The engaged position of the retaining rod 6a in the thrust bearing 3 is identified as III. The amount of spacing between the frontal surface of the adjusting rod 5a and the retaining rod 6a is such that the scraper 9 is immobilized there with a clearance s. Brief intermittent supply of cleaning means R during cleaning travel ensures that cleaning means R will also be applied to the contact surfaces between scraper (9) and frontal surface of the adjusting rod 5a on one side and between scraper (9) and retaining rod 6a on the other.

An interior outline K of the scraper station 1, 1* in the area of passage of the adjusting rod 5a, indicated by broken lines, illustrates how the interior of the scraper station 1, 1* is to be designed in this area so as to be free of dead space. Such design ensures that no product P can stagnate in this area during its travel. In addition, the adjusting rod 5a may be shortened to make it possible to move the scraper 9 to almost the immediate vicinity of the interior outline, so that the amount of product not involved in the scraping process may be reduced to a virtually negligible amount.

Figure 2:
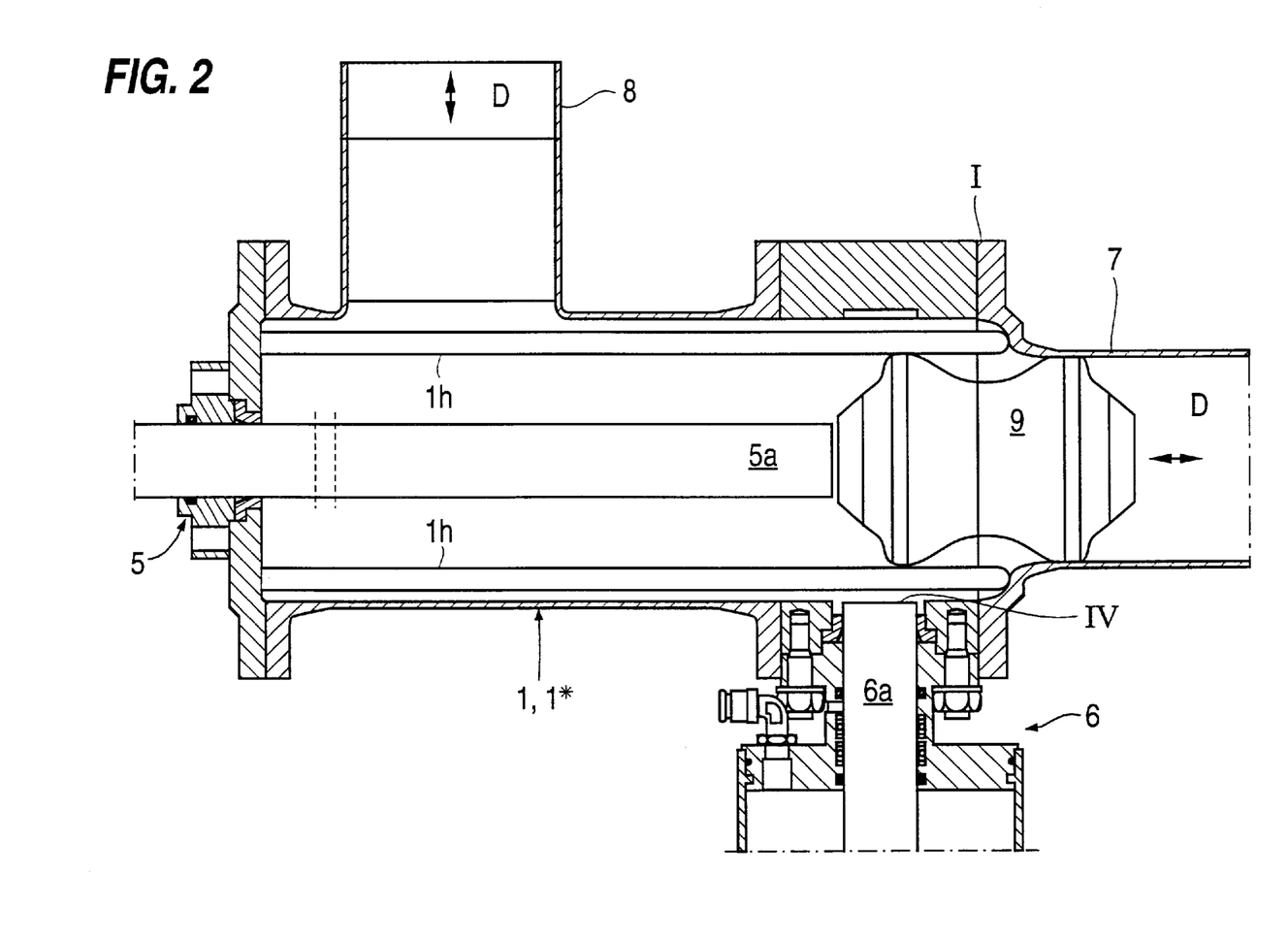
FIG. 2 shows the locked position I of the scraper inside the cleanable scraper station designed as shown in FIG. 1.

FIG. 2 illustrates the dispatching station or locked position I of the scraper 9. The latter has for this purpose been moved by the adjusting rod 5a and the drive 5 connected to it far enough in the direction of the scrapeable pipeline section 7 that its sealing surface is seated in the scrapeable pipeline section 7, while the other sealing surface is still in the cage formed by the spacers 1h. The retaining rod 6a is in a released position IV; the second drive 6 is activated. Subsequent progression of the scraper 9 in the scrapeable pipeline section 7 is effected by controlled supply of pressure means D, which may be delivered through pipeline section 8.

Depending on the mode of operation of the cleanable scraper station 1 or 1* and depending on whether it is used as a dispatching 1 or receiving 1* station, the pressure means D is routed either over the pipeline section 8 or the scrapeable pipeline section 7 and discharged over the other pipeline section. Since the cleanable scraper station 1, 1* may also be used without restrictions at the other end of the scrapeable pipeline section 7 as a receiving station 1*, a description as receiving station 1* is superfluous in this context. The reference symbols employed in the foregoing apply to the design of the scraper station as dispatching station 1. In the following summary and the claims the reference symbols applicable to the receiving station 1* are additionally identified by an asterisk (*).

A second preferred embodiment of the proposed cleanable scraper station 1,1* claimed for the invention (FIG. 3) differs externally from that illustrated in FIG. 1 initially in that the first connection 1b is provided with a housing flange 1i and the connection 1c with a housing flange 1k. In addition, the flow-around position II of the scraper 9 in the enlarged cross-section 2 is sensed by a revertive communication device 13c. The remaining structure of the scraper station 1,1* shown corresponds, insofar as the reference symbols already explained in FIGS. 1 and 2 are concerned, to that discussed at that point, the connection 1c being mounted directly on the housing flange 1d.

Figures 3, 4, 5:
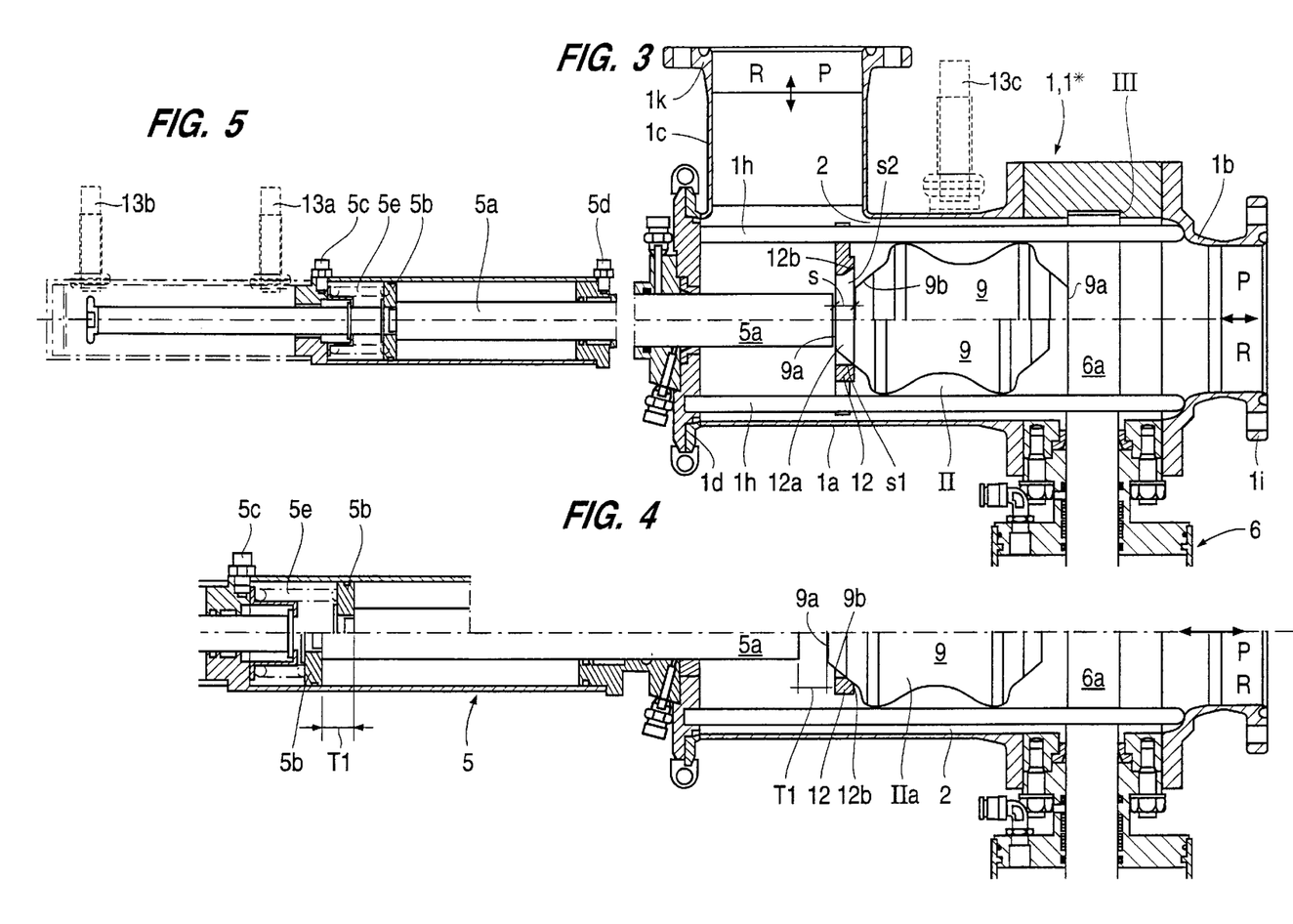
FIG. 3 is a cross-section through a second exemplary embodiment claimed for the invention, one which is modified relative to the scraper station shown in FIG. 1 and in which the scraper may be cleaned over its entire surface, in the lower part of the illustration the scraper assuming its lefthand position and in the upper part its righthand position between the two stops.
FIG. 4 is a cross-section through the scraper station, in which below the line of symmetry, the movable first stop has been moved by a partial travel distance T1 to the left and the scraper resting against a stationary stop, and through a part of the first drive, its piston having been forced by a spring mounted in the drive backward from its position shown below the line of symmetry by the partial travel distance T1 into the end position shown in FIG. 3.
FIG. 5 a cross-section through a part of the first drive as shown in FIG. 4 connected to revertive communication devices for sensing the position of the movable first stop and accordingly the scraper.

In contrast to the cleanable scraper station 1,1* described above with reference to FIGS. 1 and 2, the embodiment shown in FIG. 3 has a stationary stop which is annular in form and has a central passage 12 and which delimits the position of the scraper 9 when the latter is in its flow-around position II in the enlarged cross-section 2 if movement of the scraper 9 away from the controllable second stop 6a is possible after movement of the movable first stop 5a by a partial travel distance T1 (see FIG. 4) in the direction of the first drive 5. As is to be seen from FIG. 3, flow may move around the stationary stop 12 on the inside through passage opening 12a and on the outside in the direction of the housing 1a. In the exemplary embodiment illustrated it is fastened on one or more spacers 1h and, in keeping with its characteristic described in the foregoing, positioned so that the left frontal surface of scraper 9 comes to rest in the flow-around position identified as II in the enlarged cross-section 2 (lower illustration) against the frontal surface of the movable first stop 5a, so that a first gap s1 is formed between a tapered recess 12b in the stationary stop 12 and a corresponding tapered projection 9b on the end of the scraper 9. The scraper 9 assumes such a position when product P or cleaning means R is delivered from right to left relative to the position illustrated of the scraper station 1,1*. When the scraper 9 is in this position, its tapered end 9b is thoroughly cleaned during the cleaning process. Since the scraper 9 is mounted with sufficient clearance between the spacers 1h, its entire surface can be cleaned by cleaning means R, except for its contact surface (frontal surface 9a) with the movable first stop 5a.

The position of the scraper 9 above the line of symmetry in the scraper station 1,1* is obtained when the flow approaches the scraper 9 from the left. In this instance a second gap s2 enlarged by the amount of the clearance of the scraper 9 between the stops 5a and 6a is formed between the tapered recess 12 in the stationary stop 12 and the scraper 9. When in this position the scraper 9 may be cleaned over its entire surface on all sides for the linear contact surface between its right front end 9a and the controllable second stop 5a. In order for this contact surface as well to be covered, the cleaning means R is supplied, for example, intermittently at brief intervals, so that the scraper 9 performs oscillatory movements within the limits of its clearance between the stops 5a and 6a.

The left frontal contact surface 9a of the scraper 9, along with the associated frontal surface of the movable first stop 5a, may then be washed by the cleaning means R introduced over connection 1b if, as is illustrated in FIG. 4, the movable first stop 5a is displaced by a partial travel distance T1 in the direction of the first drive 5. The scraper 9 assumes a flow-around position IIa in the enlarged cross-section 2, in which position its previous cleaned tapered left-side end 9b comes to rest against the correspondingly shaped tapered recess 12b in the stationary stop 12. The partial travel distance T1 of the stop 5a is ensured by the end position limit stop in the first drive 5. In order to execute the partial travel distance T1, a piston 5b is forced by pressure means against a spring 5e by way of a second pressure means inlet 5d (also see FIG. 5). After pressure means activation is removed, the movable first stop 5a is returned to its initial position by the spring 5e, so that the scraper 9 assumes its flow-around position II in the enlarged cross-section 2 shown in the lower part of FIG. 3.

Movement of the scraper 9 from its flow-around position II (FIG. 3) into its locked position I (FIG. 1) is effected by application of pressure means to the first drive 5 by way of a first pressure means connection 5c, as a result of which the movable first stop 5a moves in the direction of the first connection 1b (FIG. 3). Return of the stop 5a to its position shown in FIGS. 4 and 5 is effected by reversal of flow of the pressure means from the first to the second pressure means inlet 5c and 5d. Revertive communication devices 13a and 13b are provided to report the pertinent positions of the stop 5a and accordingly of the scraper 9 (FIG. 5).

Figure 6:
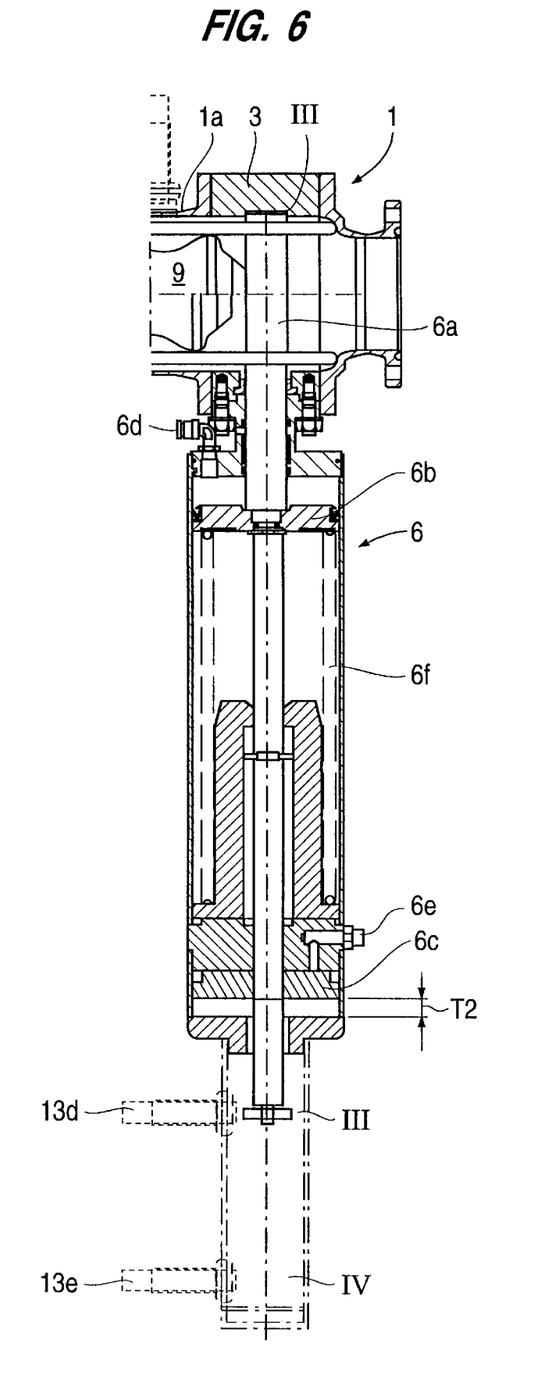
FIG. 6 a cross-section through the cleanable scraper station as shown in FIG. 2 in the area of the second drive.

FIG. 6 shows details of the second drive 6, by means of which the engaged position III of the controllable second stop 6a and also the released position IV (FIG. 2) can be achieved. The travel necessary for achievement of these end positions of the controllable second stop 6a is effected by way of a spring-loaded first piston 6b to which pressure means is applied by way of a third pressure means connection 6d. A spring 6f transfers the controllable second stop 6a to the engaged position III (rest position of the second drive 6) if no pressure means is applied. A second piston 6c can be moved a partial travel distance T2 by way of a fourth pressure means connection 6e connected to the second stop 6a, as a result of which the stop 6a leaves its engaged position III in the thrust bearing 3 in the housing 1a of the scraper station 1,1* and moves a corresponding travel distance. When the second stop 6a is in the resulting position, the area of the stop in the thrust bearing 3, which is partly covered, may also be thoroughly cleaned. The engaged position III and the released position IV of the controllable second stop 6a are each sensed by a revertive communication device 13d or 13e and the resulting data are further processed as required by control engineering processes.

The alternative second or third embodiment of the scraper station claimed for the invention (FIGS. 7 and 8) yield essentially the advantages of the scraper station shown in FIGS. 3 to 5. Identical or comparable components are identified by the same reference symbols. A description of the basic structure is accordingly superfluous. Discussion will be devoted here exclusively to the obvious differences and the additional advantages associated with them.

One striking feature is a screen cage guard 50 connected to the movable first stop 5a, in which screen cage guard the scraper 9 is positively locked. The screen cage guard 50 consists of at leas-three U-shaped elements 50a which, as viewed axially from the inside outward, form an insertion opening 50b, a passage opening 50c narrowed relative to the latter, and a radially widening grip opening 50d. An additional difference from the embodiment illustrated in FIGS. 3 to 5 is represented by a stationary stop 120 of two U-shaped elements which are mounted in reciprocal diametrical and radial symmetry and which are convex in shape in the area of their contact surface with the scraper 9. In addition, the controllable second stop 6a is made up of two lugs which are mounted in reciprocal diametrical and radial symmetry and each of which is moved by a second drive 6 into an engaged position III, each at an angle smaller than 90 degrees as measured relative to the direction of travel of the scraper 9 from the scraper station 1;1*, in the enlarged cross-section 2 of the latter.

Figure 7:
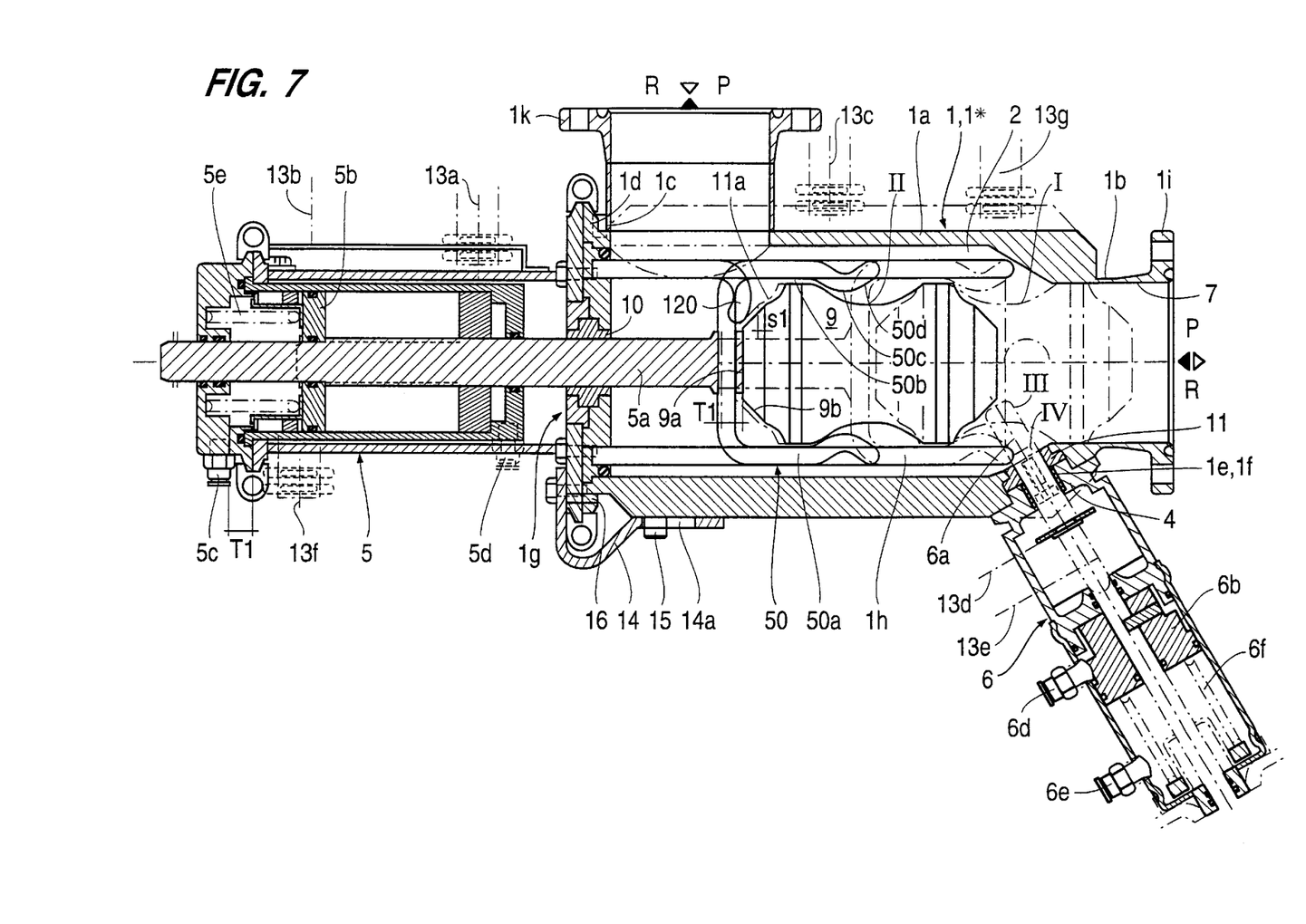
FIG. 7 a cross-section through an exemplary embodiment of the alternative second or third design claimed for the invention, in which the scraper is in addition positively locked in a screen cage guard and in which the controllable second stop consists of two lugs mounted in reciprocal diametrical and radial symmetry.
Figure 8:
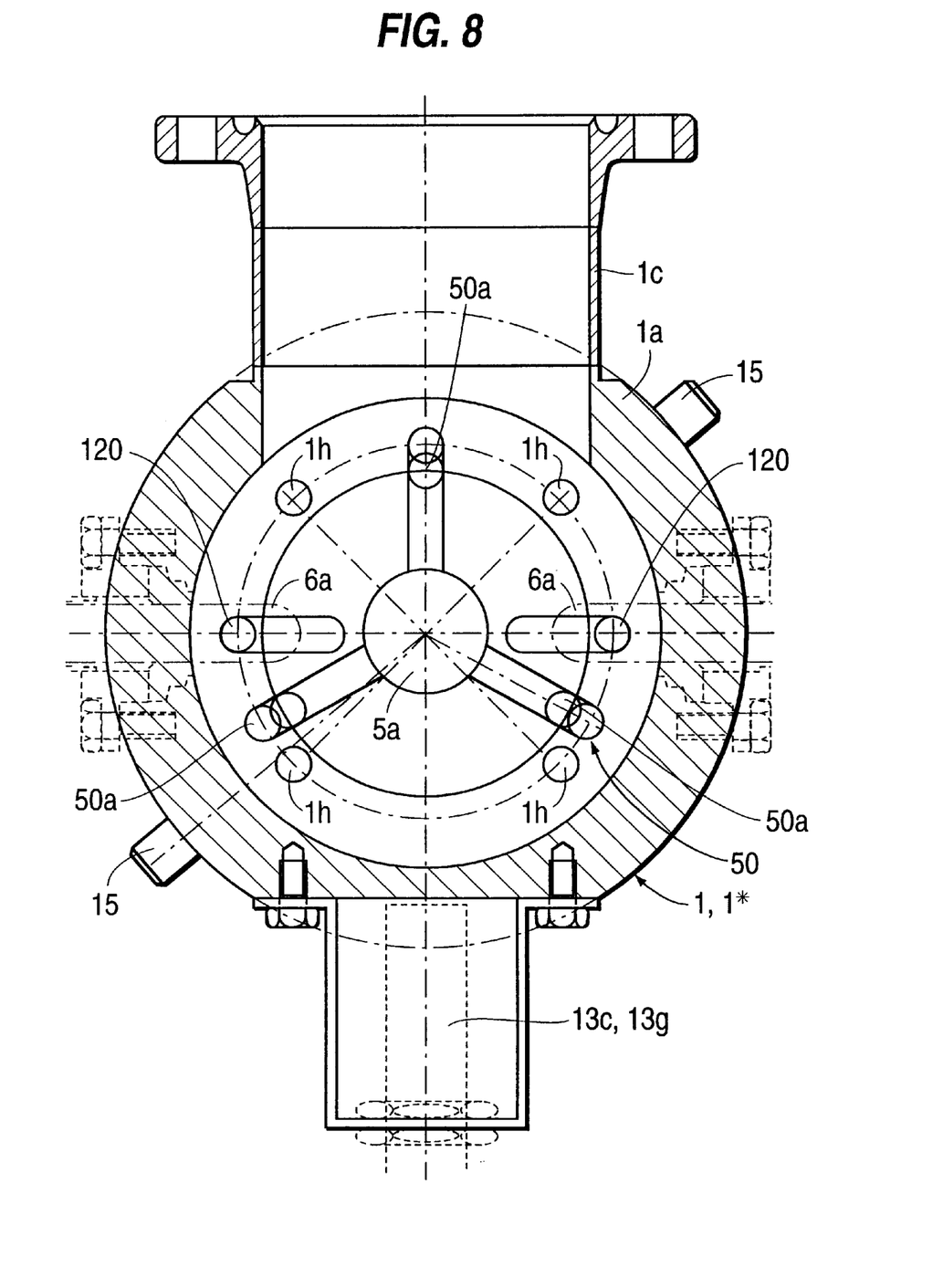
FIG. 8 a cross-section through the scraper station as shown in FIG. 7 through the center of the second connection.

Completion of the partial travel distance T1 for release of the left frontal surface 9a of the scraper 9 is reported by another revertive communication device 13f, while the locked or dispatching position I of the scraper 9 is reported by an additional revertive communication device 13g.

There is mounted on the rod passage 1g designed as a cover element a bracket 14 having a bayonet opening 14a which is engaged by a lug 15 connected to the housing 1a. In addition, there is pressed into the cover element 1g a guide pin 16 which is inserted into a hole (not shown) in the housing 1a. The components in question, which are duplicated as mirror images on the other side of the scraper station 1;1*, form a safety lock which allows opening of the scraper station 1;1* only after the pressure in the latter has been reduced. After opening of a clamping device (not shown) which connects the cover element 1g to the housing 1a of the scraper station 1;1*, the cover element must first be released from the housing 1a on the basis of the axial constraint imposed by the guide pins 16. The bayonet lock 14a, 15 initially prevents violent release of the cover element 1g from the housing 1a if pressure is present in the scraper station 1,1*. After removal of any pressure means present in the scraper station 1;1*, the bayonet lock 14a,15 may be opened by rotation and the cover element 1g fully released from the housing 1a.

As soon as the scraper 9 moves from the scrapeable pipeline section 7 into the enlarged cross-section 2, it encounters the clamp opening 50d of the screen cage guard 50, is centered there, is forced by elastic deformation through the narrowed passage 50c, and then reaches the insertion opening 50b. When in this position it is positively locked by the screen cage guard 50, the dimensions of the U-shaped elements 50a radially being such that the positive locking ensures sufficient clearance on all sides from the scraper 9. The scraper 9 is now in its locked position designated as I. Only by application of pressure can it be forced from this position in the screen cage guard 50 into the scrapeable pipeline section 7.

If the scraper 9 is now to be transferred from the locked position I into its flow-around position II, this can be accomplished with the cleanable scraper station 1,1* in any position by means of the screen cage guard 50, which continues to hold the scraper positively locked. For this purpose the movable first stop 5a, the adjusting rod, and the screen cage guard 50 connected to the latter are transferred to its other end position (flow-around position II) by means of the first drive 5. The controllable second stop 6a of the second drive 6a, in the form of lugs, may then be moved from its released position IV to its engaged position III. In relation to the layout of the scraper station 1;1* shown in FIG. 7, the scraper 9 is now axially delimited on the left by the movable first stop 5a and on the right by the controllable second stop 6a in the form of lugs. Zero-contact flow around the scraper on all sides is possible in this layout, since it has sufficient clearance on all sides from the components adjacent to it and flow around it of cleaning means causes the scraper to oscillate in both the axial and the radial directions.

When cleaning means flows through the scraper station (1;1*) from the scrapeable pipeline section 7, the entire surface of the scraper is cleaned on all sides except for its left frontal surface 9a. In order for this surface as well to be reliably cleaned, the movable first stop 5a is moved together with the screen cage guard 50 the partial travel distance T1 leftward. During this movement the scraper 9 is brought to rest against the stationary stops 120, after closing the gap S1, and during subsequent movement the frontal surface 9a of the scraper 9 is freed. In the process the narrowed passage 50c of the screen cage guard 50 moves onto the scraper 9, which widens radially in this area, but without the positive locking of the scraper in the screen cage guard 50 being fully released. During the subsequent return of the movable stop 5a over the partial travel distance T1, the scraper 9 immediately comes to rest against the controllable second stop 6a (lugs), so that positive locking of the scraper 9 in the screen cage guard 50 with clearance on all sides is again ensured.

In the alternative third embodiment of the scraper station 1,1* claimed for the invention, the positive locking of the scraper 9 in the screen cage guard 50 makes it possible to dispense with the controllable second stop 6a in cleaning the scraper, if the rate of flow in the direction of the scrapeable pipeline section 7 does not exceed the customary hydraulic and process engineering values.

FIG. 8 illustrates in particular the relative positions of the spacers 1h, the U-shaped elements 50a of the screen cage guard 50, and the stationary stop 120 made up of U-shaped elements. It also shows clearly that the screen cage guard 50 is secured against rotation between the spacers 1h and stationary stop 120, without the need for special measures for this purpose.

We claim:

1. A system in which both a product and a cleaning fluid flow, the system having a first pipeline section (8 or 8*), a second, scrapeable pipeline section (7) scrapeable by a scraper (9), and a cleanable scraper station (1;1*) which carries said product and said cleaning fluid at different times from one another, which connects the pipeline sections (7, 8 or 7,8*), and which comprises an integrated section of a product pipeline, the scraper station accommodating the scraper in a flow-around position in which a flow of fluid around the scraper and between the pipeline sections is enabled and in a locked position in which the scraper separates the pipeline sections, the scraper station having, at the flow-around position of the scraper, an enlarged cross-section relative to the scrapeable pipeline section, and in the scraper station a movable first stop (5a) for moving the scraper from its flow-around position to the locked position, the locked position defining a dispatching position of the scraper for transfer of the scraper to the scrapeable pipeline section, characterized in that the scraper (9) has a periphery and, in its flow-around position (II;II*), clearance between all of its periphery and the integrated section of a product pipeline, and the system has means for selectively maintaining said scraper in its flow-around position, wherein said means for selectively maintaining comprises means for holding said scraper from movement out of its flow-around position in a direction toward said first pipeline section and in a direction toward said second, scrapeable pipeline section.

2. A system as claimed in claim 1, wherein the scraper station (1;1*) has an interior surface conforming to lines of flow in the area of the connection (1c;1c*) between the first pipeline section and the scraper station whereby the scraper station is free of dead space.

3. A system as claimed in claim 1, further comprising at least three spacers (1h;1h*) for keeping the scraper (9) centrally positioned in the scraper station (1;1*) with respect to the area of the enlarged cross-section (2;2*).

4. A system as claimed in claim 1, wherein the controllable second stop (6a;6a*) comprises two lugs mounted in diametrically opposite positions on said scraper station and drive means for moving each said lug at an angle smaller than 90 degrees relative to the direction of travel of the scraper (9) in the scraper station (1;1*) to an engagement position for engagement with the scraper.

5. A system as claimed in claim 1, wherein the movable first stop (5a;5a*) comprises an adjusting rod that is engaged in the scraper station (1;1*) and first means for moving the first stop in the direction of the scraper (9).

6. A system as claimed in claim 5, wherein said first means comprises a spring, the system further comprising pressure means for activating said first means for moving the first stop in one direction a primary travel distance into an end position, in which the scraper (9) is in its flow-around position (II;II*) in the enlarged cross-section (2;2*), and for alternatively activating said first means for moving the first stop a partial travel distance T1 in the same direction against the spring (5e;5e*) in the first means.

7. A system as claimed in claim 1, wherein the passage cross-section of the first pipeline section (1c;1c*) is approximately equal to the passage cross-section of the scrapeable pipeline section (7).

8. A system as claimed in claim 1, wherein the passage cross-section in the enlarged cross-section (;2*), between the scraper (9) in its flow-around position (II;II*) and the integrated section of a product pipeline is approximately equal to the passage cross-section of the first pipeline section (1c;1c*).

9. A system as claimed in claim 1, wherein said means for selectively maintaining comprises a controllable second stop coacting with the movable first stop.

10. A system as claimed in claim 1, wherein said means for selectively maintaining comprises a screen cage guard connected to the movable first stop, the scraper being positively locked in the screen cage guard, the screen cage guard defining the sole means for holding said scraper from movement out of its flow-around position in a direction toward said second, scrapeable pipeline section.

11. A system as claimed in claim 10, wherein the screen cage guard (50;50*) comprises at least two U-shaped elements (50a;50a*) which, as viewed axially from the inside outward, define an insertion opening, a passage opening (50c;50c*) narrowed relative to the latter, and a radially widening clamp opening (50d;50d*).

12. A system as claimed in claim 1, further comprising means for sensing the scraper in the flow-around position and in the locked position.

13. A system as claimed in claim 1, further comprising means for preventing opening of the scraper station until pressure in the scraper station has been reduced, said preventing means comprising a cover on said scraper station and a rod connected to said movable first stop and mounted for sliding in said cover.

14. A system having a first pipeline section (8 or 8*), a second, scrapeable pipeline section (7) scrapeable by a scraper (9), and a cleanable scraper station (1;1*) which connects the pipeline sections (7, 8 or 7,8*) and which comprises an integrated section of a product pipeline, the scraper station accommodating the scraper in a flow-around position in which a flow of fluid around the scraper and between the pipeline sections is enabled and in a locked position in which the scraper separates the pipeline sections, the scraper station having, at the flow-around position of the scraper, an enlarged cross-section relative to the scrapeable pipeline section, and in the scraper station a movable first stop (5a) for moving the scraper from its flow-around position to the locked position, the locked position defining a dispatching position of the scraper for transfer of the scraper to the scrapeable pipeline section, characterized in that the scraper (9) has a periphery and, in its flow-around position (II;II*), clearance between all of its periphery and the integrated section of a product pipeline, and the system has means for selectively maintaining said scraper in its flow-around position, wherein said means for selectively maintaining comprises means for holding said scraper from movement out of its flow-around position in a direction toward said first pipeline section and in a direction toward said second, scrapeable pipeline section, wherein said means for selectively maintaining comprises a controllable second stop coacting with the movable first stop, and wherein a stationary stop (12, 120; 12, 120*) is provided which delimits the position of the scraper (9) in its flow-around position (II;II*) in the enlarged cross-section (2;2*) when, after movement of the movable first stop (5a;5a*) a partial travel distance T1 from an end position of the stop (5a;5a*), movement of the scraper (9) away from the controllable second stop (6a;6a*) is possible.

15. A system as claimed in claim 14, wherein the scraper has a first surface portion contacting the movable first stop and a second surface portion contacting the stationary stop, said first surface portion being exclusive of said second surface portion.

16. A system as claimed in claim 15, wherein the scraper has a first surface portion contacting the movable first stop and a second surface portion contacting the stationary stop, said first surface portion being exclusive of said second surface portion.

17. A system as claimed in claim 15, wherein the stationary stop (120;120*) comprises two elements which are mounted in diametrically opposite positions in the scraper station and which have a convex contact surface for engaging the scraper (9).

18. A system having a first pipeline section (8 or 8*), a second, scrapeable pipeline section (7) scrapeable by a scraper (9), and a cleanable scraper station (1;1*) which connects the pipeline sections (7, 8 or 7,8*) and which comprises an integrated section of a product pipeline, the scraper station accommodating the scraper in a flow-around position in which a flow of fluid around the scraper and between the pipeline sections is enabled and in a locked position in which the scraper separates the pipeline sections, the scraper station having, at the flow-around position of the scraper, an enlarged cross-section relative to the scrapeable pipeline section, and in the scraper station a movable first stop (5a) for moving the scraper from its flow-around position to the locked position, the locked position defining a dispatching position of the scraper for transfer of the scraper to the scrapeable pipeline section, characterized in that the scraper (9) has a periphery and, in its flow-around position (II;II*), clearance between all of its periphery and the integrated section of a product pipeline, and the system has means for selectively maintaining said scraper in its flow-around position, wherein said means for selectively maintaining comprises means for holding said scraper from movement out of its flow-around position in a direction toward said first pipeline section and in a direction toward said second, scrapeable pipeline section, wherein the controllable second stop (6a;6a*) comprises a retaining rod and means for driving the retaining rod generally transversely to the direction of movement of the scraper (9), the retaining rod having an end distal to said means for driving, said end being received in an element in said scraper station.

19. A cleanable scraper station as claimed in claim 18, wherein the second stop is in an engagement position for engagement with the scraper when said means for driving is in an inactivated condition.

20. A system as claimed in claim 18, further comprising means for sensing an engagement position of the second stop for engagement with the scraper and an opposite released position of the second stop.

21. A system as claimed in claim 20, further comprising supplemental means for moving the controllable second stop (6a;6a*) in the direction of the released position (IV;IV*) a partial travel distance T2 from its engaged position (III;III*) in the thrust bearing (3;3*) in the housing (1a;1a*) to an intermediate position in which the second stop is engageable by the scraper.

22. A system having a first pipeline section (8 or 8*), a second, scrapeable pipeline section (7) scrapeable by a scraper (9), and a cleanable scraper station (1;1*) which connects the pipeline sections (7, 8 or 7,8*) and which comprises an integrated section of a product pipeline, the scraper station accommodating the scraper in a flow-around position in which a flow of fluid around the scraper and between the pipeline sections is enabled and in a locked position in which the scraper separates the pipeline sections, the scraper station having, at the flow-around position of the scraper, an enlarged cross-section relative to the scrapeable pipeline section, and in the scraper station a movable first stop (5a) for moving the scraper from its flow-around position to the locked position, the locked position defining a dispatching position of the scraper for transfer of the scraper to the scrapeable pipeline section, characterized in that the scraper (9) has a periphery and, in its flow-around position (II;II*), clearance between all of its periphery and the integrated section of a product pipeline, and the system has means for selectively maintaining said scraper in its flow-around position, wherein said means for selectively maintaining comprises means for holding said scraper from movement out of its flow-around position in a direction toward said first pipeline section and in a direction toward said second, scrapeable pipeline section, wherein said means for selectively maintaining comprises a screen cage guard connected to the movable first stop, and a controllable second stop coacting with the screen cage guard, the scraper being positively locked in the screen cage guard.

23. A system as claimed in claim 22, wherein the screen cage guard (50;50*) comprises at least two U-shaped elements (50a;50a*) which, as viewed axially from the inside outward, define an insertion opening, a passage opening (50c;50c*) narrowed relative to the latter, and a radially widening clamp opening (50d;50d*).

24. A system as claimed in claim 22, wherein a stationary stop (12, 120; 12, 120*) is provided which delimits the position of the scraper (9) in its flow-around position (II;II*) in the enlarged cross-section (2;2*) when, after movement of the movable first stop (5a;5a*) a partial travel distance T1 from an end position of the stop (5a;5a*) movement of the scraper (9) away from the controllable second stop (6a;6a*) is possible.

25. A cleanable scraper station as claimed in claim 24, wherein the stationary stop (12;12*) is annular in shape and has a central passage opening (12a;12a*).

* * * * *